3,225,113
PROCESS FOR PURIFYING A LIQUID OLEFINIC HYDROCARBON OF ITS ETHER IMPURITY
John G. McNulty, Glenshaw, and William L. Walsh, Shaler Township, Allegheny County, Pa., assignors to Gulf Research & Development Company, Pittsburgh, Pa., a corporation of Delaware
No Drawing. Filed Oct. 25, 1962, Ser. No. 233,151
6 Claims. (Cl. 260—677)

This invention relates to a process for separating ethers selected from the group consisting of saturated aliphatic and saturated cyclic ethers from hydrocarbons admixed therewith.

The ethers defined above, as impurities, can be found in admixture with liquid hydrocarbons from which they can not easily be separated therefrom by conventional techniques such as distillation because the boiling points of such ethers and the hydrocarbon may be close to each other. Thus ethylene can be polymerized to obtain a product containing alpha-olefins having an even number of carbon atoms, from four to 20 or more, by heating the same at a temperature of about 140° to about 325° C. and a pressure of about 1000 to about 5000 pounds per square inch gauge for about two to about 300 minutes in the presence of an aluminum alkyl, such as aluminum triethyl. At the end of the reaction period the reaction mixture can be subjected to distillation conditions to separate the α-olefins from the aluminum alkyl. However, the temepratures required for distillation are sufficiently high to cause undesired isomerization of the α-olefins produced. However, if ethers such as defined above are added to the α-olefin mixture at a temperature of about 10° to about 300° C. and a pressure of about 0 to about 4000 pounds per square inch gauge, the ether will complex with the aluminum alkyl. The complex so formed will not cause isomerization of the α-olefins under the distillation conditions which are used. However, upon distillation of the mixture some of the ether will come over with the desired α-olefins.

Olefins can be reacted with boron hydrides, such as $B_2H_6$, at a temperature of about —10° to about 100° C. and a pressure of about 0 to about 2000 pounds per square inch gauge to obtain boron alkyls. Olefins which can be so reacted with boron hydrides include terminal olefins having from two to 30 carbon atoms such as ethylene, hexene-1, octene-1, decene-1, dodecene-1, tetradecene-1, octadecene-1, tetracosene-1, octacosene-1, etc.; terminal branched olefins having from four to 30 carbon atoms such as isobutylene, 3-methylbutene-1, 2-methylbutene-1, 3,3-dimethylbutene-1, 4,4-dimethylpentene-1, 2-methylpentene-1, 2,4,4-trimethylpentene-1, 2-ethyldecene-1, 2-ethyleicosene-1, etc.; dialkyl internal olefins having from four to 10 carbon atoms such as hexene-2, hexene-3, octene-2, 4-methylpentene-2, 4,4-dimethylpentene-2, etc.; cyclic olefins such as cyclopentene, cyclohexene, α-pinene, norbornene, etc.; trialkyl olefins having from five to eight carbon atoms such as 2-methylbutene-2, 2-methylpentene-2, 3-ethylpentene-2, 1-methylcyclohexene, 2,4,4-trimethylpentene-2, etc.; tetraalkyl olefins having from six to eight carbons such as dimethylbutene-2, 1,2-dimethylcyclopentene, 1,2-dimethylcyclohexene, etc. At a temperature of about 25° to about 250° C. and a pressure of about 0 to about 2000 pounds per square inch gauge and in the presence of an ether such as defined above the boron alkyl is isomerized, the boron atom moving from an internal position to a terminal position on the alkyl substituent. The alkyl substituent on the boron alkyl can then be displaced therefrom by higher boiling α-olefins, resulting in the production of desired α-olefins. When this mixture is subjected to distillation conditions, the α-olefins recovered overhead will have admixed therewith some of the defined ether employed in the process.

The defined ethers are excellent solvents in processes wherein lithium aluminum hydride is employed to reduce an organic compound such as an aldehyde. The reduced compound, even after separation of said ether therefrom, may still be associated with some of said ether as impurity.

We have found that a hydrocarbon mixture contaminated with an ether, particularly as defined hereinabove, can be purified thereof by treating the mixture with a halide of an alkaline earth metal selected from the group consisting of calcium, strontium, barium and radium. Examples of such compounds are $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaI_2$, $RaF_2$, $RaCl_2$, $RaBr_2$ and $RaI_2$. Of these we prefer calcium chloride. As a result of such treatment a complex is formed between the ether and the metal halide defined above. We believe the metal complex to be formed between the metal halide and the oxygen on the ether. While a satisfactory complex will be formed with an ether containing but one oxygen atom in the molecule, the more oxygen atoms there are in the ether molecule the more opportunity for complexing with the metal halide arises. Since each oxygen atom will complex with one metal halide molecule, the more oxygen atoms there are in the ether molecule, the more metal halide molecules will complex therewith. This increase in utilization of metal halide molecules results in a complex of a highly polar nature, as a result of which its solubility in the organic or hydrocarbon layer decreases and its solubility in the aqueous layer, when present, increases. The amount of metal halide employed is that amount at least sufficient stoichiometrically to react with the oxygen atoms in the ether. Additionally the ether must be one wherein the carbon atoms to oxygen atom ratio in the molecule is from 2:1 to 8:1, preferably 2:1.

Examples of ethers which can be in admixture with the hydrocarbons defined hereinabove and which can form the desired complex with the defined metal halides are ethers selected from the group consisting of saturated aliphatic and saturated cyclic ethers, such as dimethyl ether,
1,2-dimethoxyethane,
bis(2-methoxyethyl)ether,
1,2 bis(2-methoxyethoxy)ethane,
bis[2(2-methoxyethoxy)ethyl]ether,
bis[2(2-methoxy-2-ethoxyethoxy)ethyl]ether,
bis[2(2-methoxy-2-ethoxy-2-ethoxyethoxy)ethyl]ether,
bis[2(2-methoxy-2-ethoxy-2-ethoxy-2-ethoxyethoxy) ethyl]ether,
bis[2(2-methoxy-2-ethoxy-2-ethoxy-2-ethoxy-2-ethoxyethoxy)ethyl]ether,
dioxane,
dimethylmetadioxane,
diethylether,
dibutylether,
tetrahydrofuran, etc.

Conditions necessary to obtain the desired complex are not critical. Thus a temperature of about —10° to about 250° C., preferably about 25° to about 150° C., and a pressure of about 0 to about 2500 pounds per square inch gauge, preferably about 0 to about 250 pounds per square inch gauge, is satisfactory. A reaction time of about one minute to about one hour can be employed. In the event the complex formed is a solid and precipitates out of solution, even though an aqueous solution is present, the mixture can be filtered to remove the complex therefrom. If water is present an upper hydrocarbon layer and a lower aqueous layer will be present. Decantation, or other suitable means, can be employed to separate the two layers from each other. Any complex soluble in the aqueous phase will be removed therewith. In the event water is not present in the mixture, filtration and removal of the complex from the mixture will result in a purified hydrocarbon.

The invention can further be illustrated by the following:

EXAMPLE I

Into a 500 milliliter distillation flask there was added 159.1 grams of α-olefins obtained as a result of the polymerization of ethylene using aluminum triethyl therefor and 12.0 grams of bis[2(2-methoxyethoxy)ethyl] ether. The olefins in the mixture were $C_{10}$, $C_{12}$, $C_{14}$, $C_{16}$ and $C_{18}$ α-olefins. The mixture was distilled at a temperature of from 64° to 160° C. and atmospheric pressure for 2½ hours and at a temperature of 68° to 197° C. and 10 mm. Hg absolute for 3½ hours. The $C_{10}$, $C_{12}$ and $C_{14}$ α-olefins were recovered as pure olefins by this distillation procedure, but it was impossible to recover $C_{16}$ or $C_{18}$ α-olefins free of the ether by this procedure. To a mixture similar to one described there was added four grams of a saturated solution of calcium chloride at a temperature of 25° C., and after one minute at a temperature of 50° C. and a pressure of 0 pounds per square inch gauge there was obtained a precipitate of the ether-calcium complex. The mixture was decanted to remove the precipitate therefrom. The results obtained are tabulated below in Table I.

*Table I*

| Component in Mixture | Percent by Weight in Charge | Percent by Weight in Recovered Product |
|---|---|---|
| $C_{10}$ α-olefin | 3.8 | 6.1 |
| $C_{12}$ α-olefin | 9.6 | 13.7 |
| $C_{14}$ α-olefin | 12.8 | 19.1 |
| $C_{16}$ α-olefin | 32.6 | 47.8 |
| $C_{18}$ α-olefin | 15.8 | 13.3 |
| Bis[2(2-methoxyethoxy)ethyl] ether | 25.4 | 0.0 |

From the above it is apparent that when the ether was complexed with the calcium salt the α-olefin product was completely free of contaminating ether. In the event it is desired to recover the metal halide from the recovered complex, the complex can be subjected to a temperature of about 100° to about 250° C. and a pressure of about one mm. Hg absolute to about 1000 pounds per square inch gauge for about one minute to about one hour. The ether will vaporize over and will be easily recoverable by conventional means.

EXAMPLE II

Additional tests were run showing the formation of complexes between calcium chloride, barium chloride and strontium chloride and bis[2(2-methoxyethoxy)ethyl] ether. To each of three test tubes containing a thermometer there was added 5 cc. of bis[2(2-methoxyethoxy) ethyl]ether and then 5 cc. of the respective saturated salt solutions. The initial temperature was room temperature. No heat was added and the temperature was measured at the end of two minutes. The reaction leading to the formation of the desired complex being exothermic, the temperature of the mixture at the end of two minutes reflected the extent to which the reaction had proceeded. The results obtained are tabulated below.

*Table II*

| Saturated Salt Solution | Bis[2(2-methoxy-ethoxy)ethyl] ether | Init. Temp., °C. | Final Temp., °C. | Complex Formation |
|---|---|---|---|---|
| $SrCl_2$ | Yes | 29 | 45 | Some precipitation. |
| $BaCl_2$ | Yes | 29 | 44 | Do. |
| $CaCl_2$ | Yes | 28 | 71 | Solid complex. |

The rise in temperature and the formation of some precipitate with strontium chloride and barium chloride when they were used with the ether is an indication of their usefulness in the process of this invention. The greater rise in temperature and the formation of a solid complex when calcium chloride was employed proves its greater usefulness herein.

EXAMPLE III

The following runs show that the ethers most easily complexed in accordance with the process of this invention are those having a carbon atom to oxygen atom ratio of 2:1 to 8:1, preferably 2:1. In the runs whose data are tabulated below 5 cc. of a saturated calcium chloride solution was added to each of four test tubes containing different ethers. The pressure was atmospheric and no heat was added to the reaction zones. The temperature rise at the end of two minutes was measured in each instance. The results are tabulated below in Table III.

*Table III*

| Alkylene Oxide Ether | Carbon Atom to Oxygen Atom Ratio | Init. Temp., °C. | Final Temp., °C. |
|---|---|---|---|
| Dioxane | 2:1 | 26 | 42 |
| Dimethylmetadioxane | 3:1 | 26 | 30 |
| Diethylether | 4:1 | 26 | 29 |
| Dibutylether | 8:1 | 27 | 28 |

The greatest temperature rise occurred when dioxane, which has a carbon atom to oxygen atom ratio of 2:1, was used. The temperature rise, and accordingly the amount of reaction occurring, became progressively lower as the carbon atom to oxygen atom ratio of the ether was raised.

EXAMPLE IV

That the complex formed herein can be decomposed and the ether can be recovered can be seen from the following. A saturated calcium chloride solution was added to a mixture containing 4 grams of hexadecene-1 and 5 grams of 1,2-bis(2-methoxyethoxy)ethane. The temperature rose to 60° C. at the end of two minutes and the calcium chloride-ether complex which precipitated was removed from the slurry by a suction filter. The filter cake was then washed with n-hexane to remove the hexadecene-1. The filter cake was then transferred to a reaction tube where it was heated to 120° C., resulting in the complex melting to give two layers. The top layer was removed and sampled for chromatographic analysis. The analysis showed that the liquid was pure 1,2-bis(2-methoxyethoxy)ethane.

Obviously many modifications and variations of the invention can be made without departing from the spirit and scope thereof and therefore only such limitations should be imposed as are indicated in the appended claims.

We claim:

1. A process for separating a liquid olefinic hydrocarbon from an ether selected from the group consisting of saturated aliphatic and saturated cyclic ethers wherein the carbon atom to oxygen ratio in the molecule is from 2:1 to 8:1 difficult to separate therefrom which comprises adding an aqueous solution of calcium chloride to the mixture in an amount sufficient to form a complex with said ether and thereafter separating said complex from said liquid olefinic hydrocarbon.

2. A process for separating a liquid olefinic hydrocarbon from an ether selected from the group consisting of saturated aliphatic and saturated cyclic ethers wherein the carbon atom to oxygen ratio in the molecule is from 2:1 to 8:1 difficult to separate therefrom which comprises adding an aqueous solution of calcium chloride to the mixture in an amount sufficient to form a complex with said ether in the form of a precipitate and thereafter separating said complex from said liquid olefinic hydrocarbon.

3. A process for separating a liquid olefinic hydrocarbon from an ether selected from the group consisting of saturated aliphatic and saturated cyclic ethers wherein the carbon atom to oxygen ratio in the molecule is from 2:1 to 8:1 difficult to separate therefrom which comprises adding an aqueous solution of calcium chloride to the mixture in an amount sufficient to form a complex with said ether to obtain an aqueous layer containing said complex and an organic layer containing said liquid olefinic hydrocarbon, and thereafter separating said layers from each other.

4. A process for separating a liquid olefinic hydrocarbon from bis[2(2-methoxyethoxy)ethyl]ether difficult to separate therefrom which comprises adding an aqueous solution of calcium chloride to the mixture in an amount sufficient to form a complex with said ether and thereafter separating said complex from said liquid olefinic hydrocarbon.

5. A process for separating a liquid olefinic hydrocarbon from bis[2(2-methoxyethoxy)ethyl]ether difficult to separate therefrom which comprises adding an aqueous solution of calcium chloride to the mixture in an amount sufficient to form a complex with said ether in the form of a precipitate and thereafter separating said complex from said liquid olefinic hydrocarbon.

6. A process for separating a liquid olefinic hydrocarbon from bis[2(2-methoxyethoxy)ethyl]ether difficult to separate therefrom which comprises adding an aqueous solution of calcium chloride to the mixture in an amount sufficient to form a complex with said ether to obtain an aqueous layer containing said complex and an organic layer containing said liquid olefinic hydrocarbon, and thereafter separating said layers from each other.

References Cited by the Examiner

UNITED STATES PATENTS

| | | | |
|---|---|---|---|
| 2,305,323 | 12/1942 | Savelli | 208—188 |
| 2,386,357 | 10/1945 | Schulze et al. | 260—681.5 |

OTHER REFERENCES

Bogardus et al.: Journal of Physical Chemistry, 1943, volume 47, pages 650–654.

Lynch: Journal of Physical Chemistry, 1942, volume 46, pages 366–370.

ALPHONSO D. SULLIVAN, *Primary Examiner.*